United States Patent [19]
Oei et al.

[11] Patent Number: 6,114,690
[45] Date of Patent: Sep. 5, 2000

[54] LIGHT-CONTROLLED SAFETY SWITCH FOR A PUNCH PRESS

[75] Inventors: Thomas G. Oei, Allentown; James R. Dickert, Pipersville; Kenneth A. Swanstrom, Doylestown; Edward P. Yeh, Harleysville, all of Pa.

[73] Assignee: Penn Engineering & Manufacturing Corp., Danboro, Pa.

[21] Appl. No.: 09/165,100

[22] Filed: Oct. 2, 1998

Related U.S. Application Data

[60] Provisional application No. 60/072,306, Jan. 23, 1998, and provisional application No. 60/086,886, May 27, 1998.

[51] Int. Cl.[7] .............................. H01J 40/14; G08B 21/00
[52] U.S. Cl. .......................... 250/221; 250/229; 250/232; 340/686.1; 408/16
[58] Field of Search ................................ 250/221, 229, 250/231.1, 232; 340/540, 680, 686.1; 361/177, 189; 408/6, 13, 16

[56] References Cited

U.S. PATENT DOCUMENTS

| | | | |
|---|---|---|---|
| 3,636,543 | 1/1972 | Maecker | 340/259 |
| 3,816,745 | 6/1974 | Primm et al. | 250/221 |
| 3,842,260 | 10/1974 | Christensen et al. | 250/221 |
| 3,919,546 | 11/1975 | Lutus | 250/205 |
| 4,547,772 | 10/1985 | Ernst | 340/686.1 |
| 4,564,765 | 1/1986 | Blaich | 250/561 |
| 5,175,532 | 12/1992 | Wojciechowski et al. | 340/686 |
| 5,319,357 | 6/1994 | Diei et al. | 340/680 |
| 5,415,053 | 5/1995 | Elias | 73/865.7 |
| 5,531,087 | 7/1996 | Kitabayashi et al. | 73/37 |
| 5,694,117 | 12/1997 | Sugarek | 340/686.1 |

*Primary Examiner*—Stephone B. Allen
*Attorney, Agent, or Firm*—Gregory J. Gore

[57] ABSTRACT

A light-controlled safety switch for an automated press includes an optical transmitter and receiver affixed to the press frame just above the press ram that redirects the light beam from vertical to horizontal. A light beam is directed downward from the transmitter to a 45-degree reflective surface on the ram. A cross-hole, perpendicular to the centerline of the ram, and a second 45-degree opposite-facing reflector opposite to the first reflective surface returns the light beam to the receiver. Thus, an optical path is achieved from the transmitter to the first reflector, through the ram, to the second reflector and then back up to the receiver. The opposing 45-degree reflectors are preferably provided by a 45-degree dished collar with a light-reflective interfacing surface fitted about the ram. The collar, and thus the reflective surfaces, stroke up and down with the movement of the ram, but maintains the optical path from the transmitter to the receiver because the send and receive light paths are parallel to the linear motion of the ram. A light-blocking shutter is connected to the top of a slidable punch holder assembly that breaks the horizontal light beam through the ram centerline whenever the punch contacts an object. Thus, the present optical system replaces the hard-wired punch contact safety switch of the prior art and its external wiring, thereby providing many advantages.

9 Claims, 4 Drawing Sheets

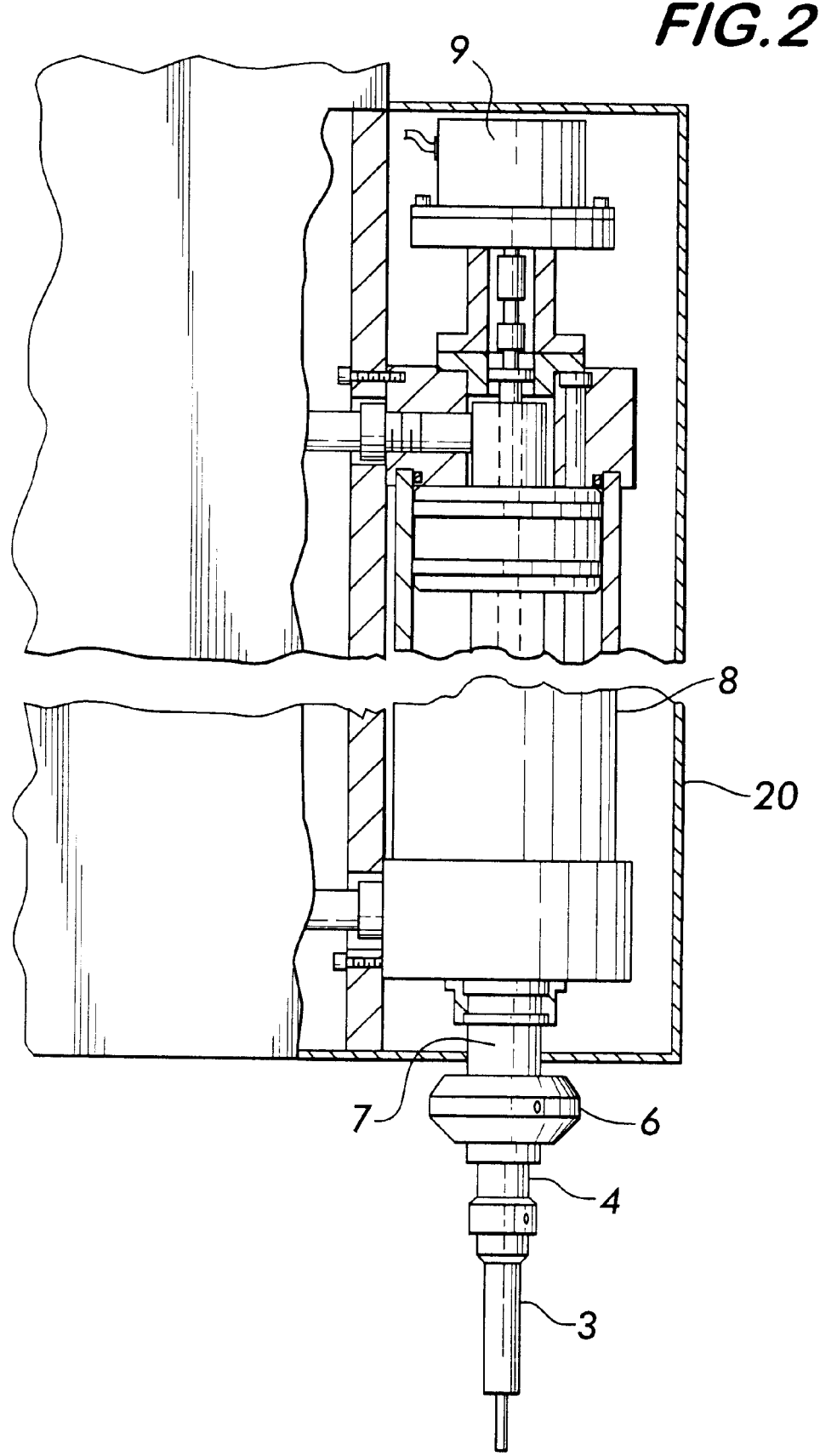

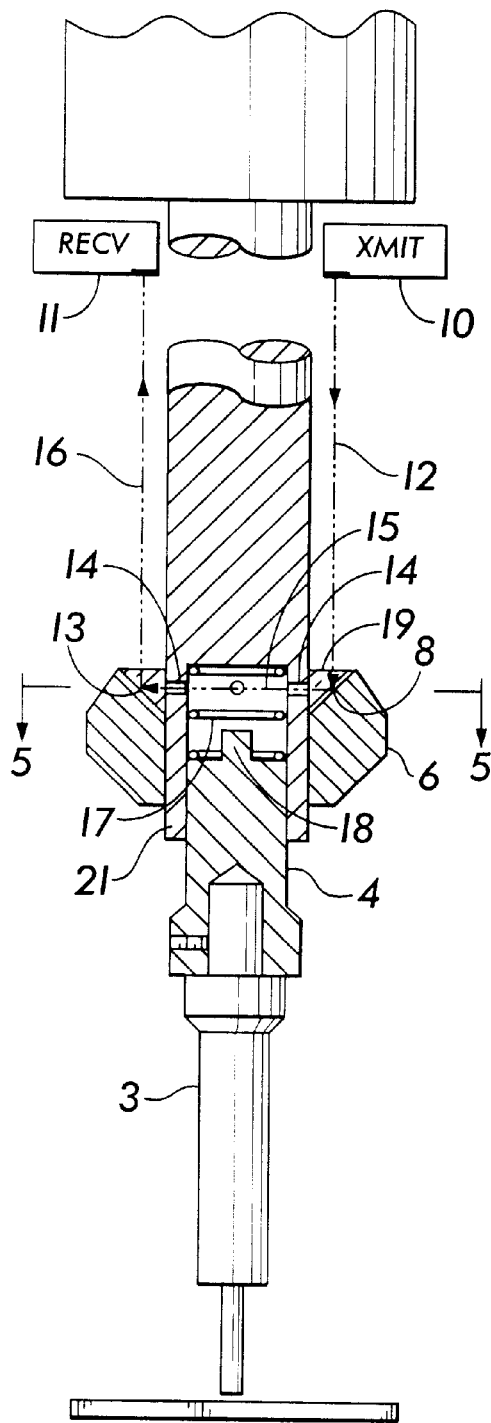
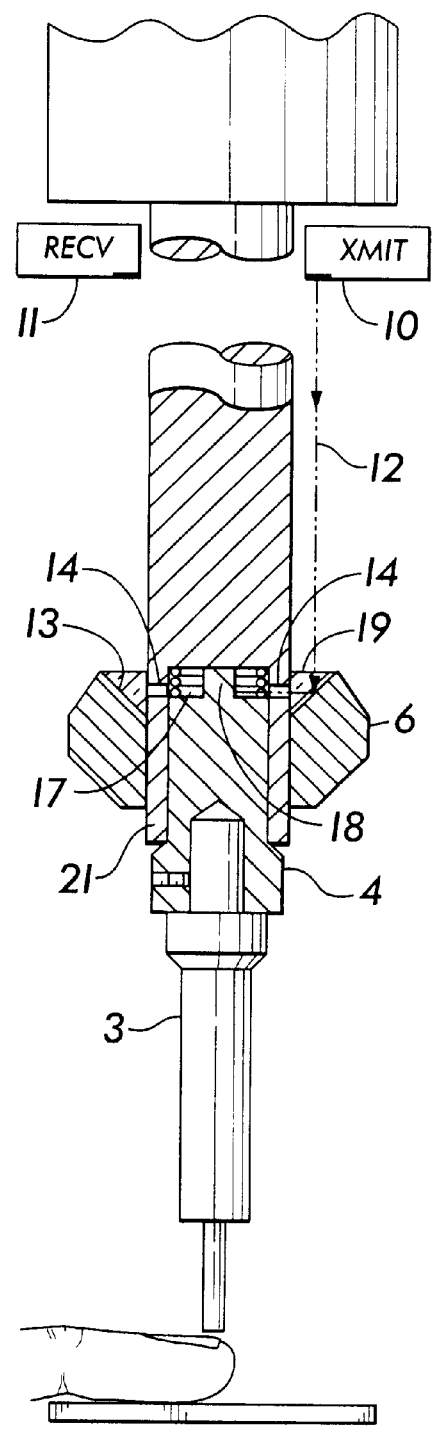

LIGHT-CONTROLLED SAFETY SWITCH FOR A PUNCH PRESS

Priority based upon provisional application Ser. No. 60/072,306 filed on Jan. 23, 1998, entitled "Light-Controlled Safety Switch", and provisional application Ser. No. 60/086,886 filed on May 27, 1998, entitled "Light-Controlled Safety Switch", is hereby claimed.

FIELD OF THE INVENTION

This invention relates to machine safety devices. More specifically, it relates to a simpler, more reliable means to detect an unsafe condition at the point-of-operation of a fastener installation press.

BACKGROUND OF THE INVENTION AND DESCRIPTION OF PRIOR ART

Fastener installation presses typically are comprised of an escapement means to deliver a fastener to a designated position under a press ram, plus the mechanism of the ram itself which delivers the fastener, usually with some amount of high force, to a workpiece, whereupon the fastener is pressed firmly into the workpiece.

It is of the utmost importance to provide point-of-operation safety that detects an unsafe condition in the working of such presses. Heretofore, the method of providing such safety for both worker and workpiece has been accomplished in some presses by using a sensing means on or about the ram itself to provide absolute position sensing of the ram, plus switch means integral with a sliding, spring-loaded sleeve (punch adapter) at the end of the ram.

Machine electronics compare the location of the ram with the status of the switch to determine if an unsafe condition exists. Displacement of the punch assembly at any point outside of the working zone of operation halts the ram. Such unsafe conditions which would cause the punch adapter to move include contacting a worker's hand or finger in the path of the descending ram, a misplaced workpiece, or a misaligned fastener.

Other types of sensing may also be used, such as normally developing an electrical contact between the punch and the workpiece, wherein the lack of such contact serves to detect a worker's finger. Presses employing one or a combination of the above sensing means are used in press models HP2.5, HP6, and HP10 manufactured by Haeger, Inc., Oakdale, Calif.; press model AS-7.5 manufactured by Auto-Sert, Inc., Minneapolis, Minn.; or PEMSERTER Series 2000 presses manufactured by Penn Engineering & Manufacturing Corp., Danboro, Pa.

Typical in the industry and employed by all of the aforementioned presses, the ram sensing means is connected to the press electronics by a cable. As the ram strokes up and down through several thousands of cycles installing fasteners, this cable is subject to chaffing, wear, and breakage, leading to replacement, downtime, warranty costs, etc. The safety means is usually inherently safe, in that a broken cable and thus a missing signal, is detected as a fault, and the machine electronics signal a valve to halt the descending ram. However, should the cable break in such a manner that the conducting wires of the cable come in contact with each other, no fault would be detected and worker safety could be compromised. Furthermore, the workpiece which might be damaged could be a very costly assembly, such as a multilayered printed circuit board that might have to be scrapped. At the very least, the press is subjected to downtime, and production delays are experienced during the replacement of the damaged cable.

There is therefore a need to eliminate the cable that connects the end of ram sensing means to the press frame, while still being able to detect the movement of the punch adapter, and thus a possible unsafe condition.

SUMMARY OF THE INVENTION

In order to solve the needs in the art, the present means of detecting an unsafe condition has been devised. It includes an optical transmitter which is affixed to the press frame and is located near the uppermost point of the press ram with its aperture pointing downward, and an optical receiver, also affixed to the press frame, located on the opposite side of the press ram with its aperture also pointing downward. A light beam is projected downward from the transmitter to a 45-degree reflective surface on the ram. A cross-hole, perpendicular to the centerline of the ram, is provided near the working end of the ram so that a horizontal optical path through the ram axis is established. A second 45-degree opposite-facing reflector is located on the opposite side of the ram. An optical path is thus achieved from the transmitter to the first reflector, through the ram, to the second reflector, and up to the receiver. A dished collar with a light-reflective inner-facing surface is fitted about the ram and provides the two opposing 45-degree reflectors. The collar, and thus the reflective surfaces, stroke up and down with the movement of the ram, but maintain the optical path from the transmitter to the reflector because the vertical light paths are parallel to the linear motion of the ram.

A punch holder located at the end of the ram is lightly biased by a spring so that the upper extension of the punch holder is out of the optical path of the safety beam. Should an unsafe condition occur, such as contact with a worker's finger as described above, the punch holder is pushed upwards and the upper extension of the punch holder blocks the light beam, signaling the press electronics that an unsafe condition exists, causing the press to halt. This is accomplished without the need for any external wiring which, as described above, has been problematic. The displaceable collar also serves as a press halting safety. If the collar is displaced upward or downward, the optical path of the safety light beam is broken.

An enhanced embodiment may include one or more additional light beams similarly reflected by the same light-reflecting collar, each light beam having its own emitter/sensor pair positioned radially 180-degrees apart so that a redundancy of motion-sensing systems can be provided to ensure reliability. Furthermore, since there may be a potential safety hazard created by the top of the light-reflecting collar being in motion close to the underside of the press housing, the collar may be affixed to the ram by a breakaway joint. The joint may be created, for example, by a resiliently-biased, ball-and-indent connection so that the collar may be firmly held to the ram, while being able to move away axially if the force exerted from the top of the collar is greater than the biasing force of the locating ball element. Thus, if a worker's hands or fingers become pinched between the top of the collar and the underside of the housing, the collar will break away from its fixed position on the ram, preventing injury. As an added feature, the frustoconical well between the collar and the ram may be filled by a transparent material to prevent the accumulation of dust or dirt that would impair the optical qualities of the collar.

Other objects, advantages and novel features of the invention will become apparent from the following detailed description of the invention when considered in conjunction with the accompanying drawings.

BRIEF DESCRIPTION OF THE DRAWINGS

FIG. 2 is a left side sectional view of installation press which includes the present invention.

FIG. 3 is a cross-sectional and schematic diagram showing the ram punch in its extended position.

FIG. 4 is a cross-sectional and schematic diagram showing the ram punch upwardly displaced.

DESCRIPTION OF THE PREFERRED EMBODIMENT

Figure 1:
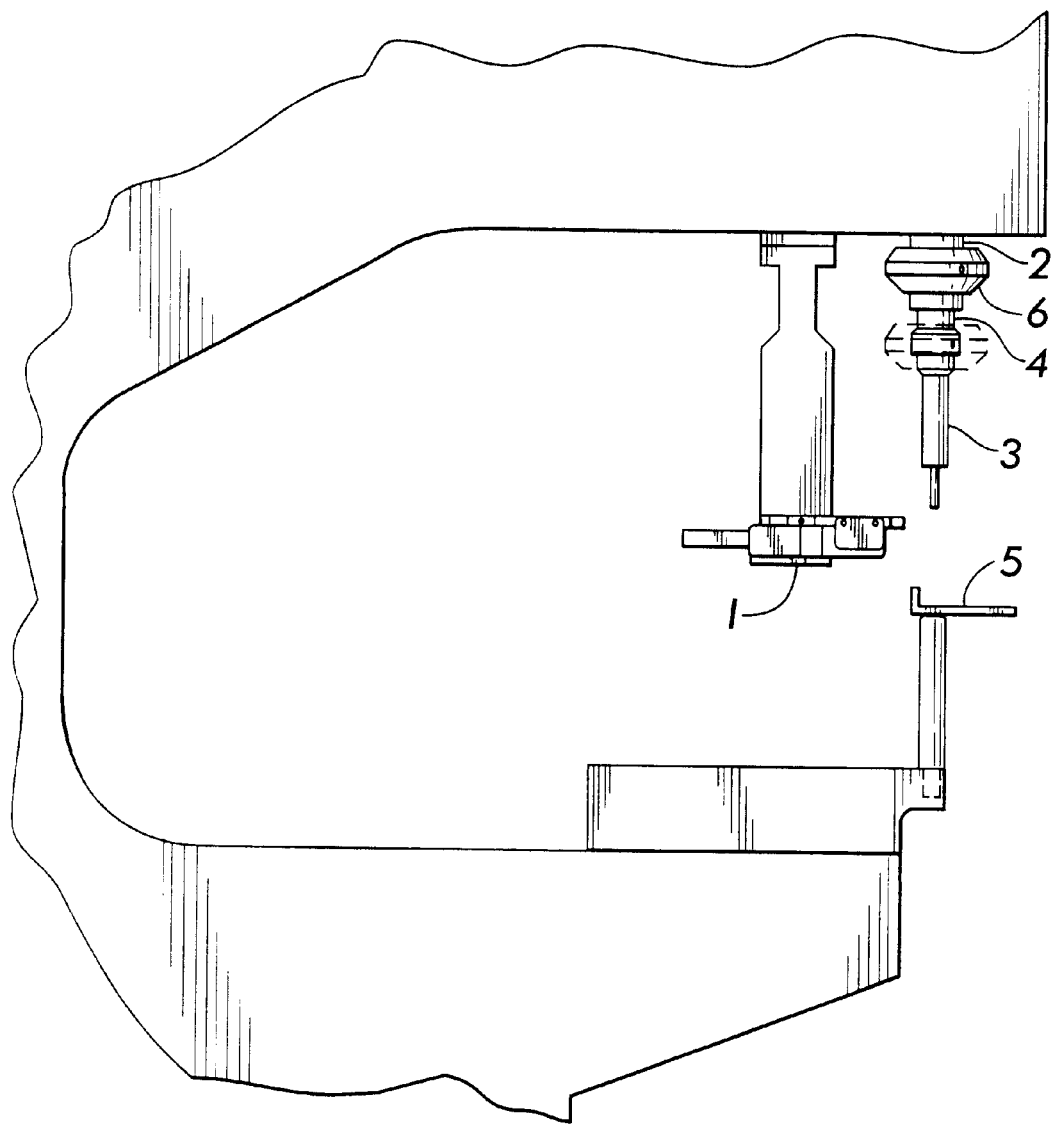
FIG. 1 is a left side view of a fastener installation press which includes the present invention.

FIG. 1 is a left side view of a fastener installation press, showing fastener escapement means 1, ram 2, with its integral punch 3, and punch adapter 4. Also shown beneath the punch is workpiece 5. In operation, upon the initiation of a cycle, punch 3 picks up fastener from escapement 1, delivers and installs it in workpiece 5 under high force. Reflective collar 6, fitted to the ram 2, contains an inner-facing reflective frustoconical surface that provides opposing 45-degree reflecting surfaces which direct the light beam. As will be described in further detail, optical collar 6 is releasably affixed to the ram to provide a breakaway feature that prevents operator injury should the operator's hand become trapped between the upward-moving ram/collar assembly and the underside of press housing 20. In this figure, the collar is shown in its breakaway position in phantom.

FIG. 2 is a left side schematic of the press showing hydraulic cylinder 8, containing ram 7 and absolute position sensing means 2 located within ram housing 20. Sensing means 9 in this embodiment is a transducer which indicates the position of the ram at all points along its stroke. The sensing means are connected to operational controller circuitry which responds to ram position when the punch contacts an object. If contact is detected at a point along the stroke of the ram outside of a predetermined zone of operation, the operational controller halts the motion of the press.

FIG. 3 shows the light beam transmitter 10, light beam receiver 11, descending optical path 12, first reflecting surface 8, ram through-hole 14, second reflecting surface 13 and ascending optical path 16. An optically-clear ring 19 fills the frustoconical well around the top of the collar to prevent the accumulation of dust or dirt. This transparent ring 19 is preferably comprised of an acrylic plastic. As further shown in this figure, the light path 15 travels horizontally across through the center of the ram through diametrically opposed holes 14 in the outer wall of a sleeve 21 at the bottom of the ram. Punch assembly 4 is slidably affixed into sleeve 21 and includes upper projecting shutter member 18 at the top and punch 22 at the bottom. The shutter member 18 breaks the horizontal path 15 of the light beam when the punch is moved upward relative to the ram as depicted in FIG. 4. The punch assembly is biased downward by spring 17. It has also been found that the invention will function by the use of the transparent ring 19 alone without a surrounding reflective collar. The ring by itself provides sufficient light path direction by the prismatic effect of the light beam passing through the material and, thus, represents an alternate embodiment of the invention.

FIG. 4 shows the relations of the punch, punch adapter, collar, descending optical beam, ascending optical beam, punch holder bias spring 17, and shutter means 18 extending from the top of punch assembly 4 which holds punch 22. In operation, when the ram punch assembly contacts an object, whether it be the workpiece or the hand of an operator, the punch tip is moved upward and shutter 18 breaks the light path 12 so that the ascending light beam 16 to the receiver shown in FIG. 3 is interrupted. The operational controller is thereby signaled that punch contact has occurred. This embodiment utilizes double emitters and receivers radially spaced 90-degrees apart to provide a redundant sensor system for greater safety. Accordingly, the reflector collar includes four reflector surfaces 90-degrees apart and four aligned cross-holes through the wall of the sleeve. The light beams cross at the axis of the safety housing assembly and either emitter/receiver pair will operate separately to provide the safety sensor function. The operational controller detects the upward movement of the punch assembly when the signal transmitted to the controller by the light beam receiver is discontinued. This occurs whenever either light beam is broken, whether by shutter 18 or by another object in the area around the ram. This provides an additional safety feature which halts the operation of the press when objects become dangerously close to the movement of the ram while in operation.

Figure 5:
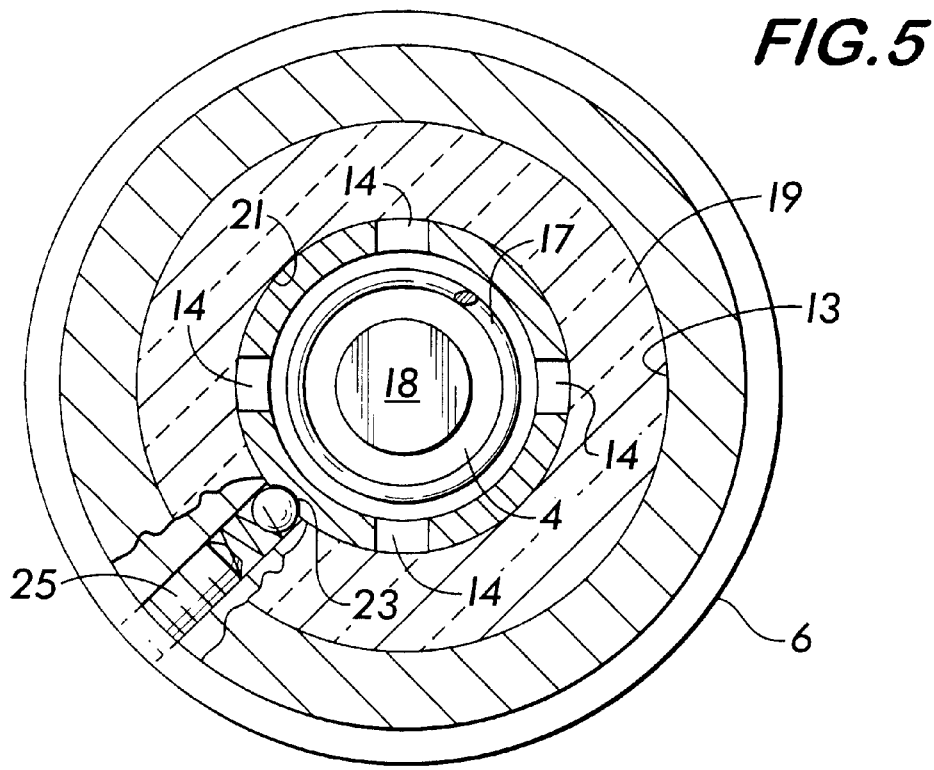
FIG. 5 shows a plan cross-sectional view of the reflective collar of the present invention.
Figure 6:
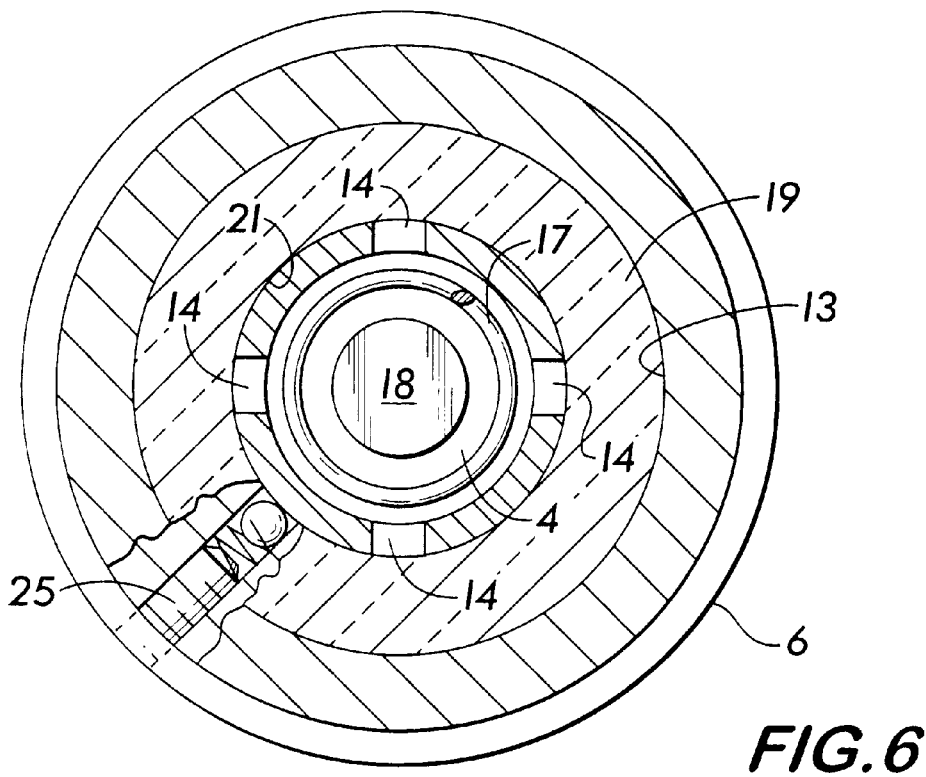
FIG. 6 is a plan cross-sectional view of the light-reflective collar of the present invention in its breakaway position.

Referring now to FIGS. 5 and 6, greater detail of the reflector collar 6 is shown. The reflector collar includes a spring-biased ball assembly 25 which mates with a detent 23 in the outer surface of ram sleeve 21 to provide a releasable snap-fit of the collar about the shaft of the ram. This provides the reflector assembly with a worker safety break-away feature. The collar is releasably held to the shaft of the ram to protect a worker's hand and/or fingers from becoming trapped between the underside of the press housing and the top of the reflector collar when the ram is being retracted. The collar will release and move out of the detent 23 shown in FIG. 5 and slide down the shaft of the ram to the position shown in FIG. 6, preventing worker injury. Greater details of the relations between the structures of the present invention are also shown. Spring 17 biases downward punch assembly 4 which includes extension 18. Transparent material 19 fills the frustoconical space around the top of the collar between its inside surface and the outside surface of sleeve 21. Transparent material 19 may be a separate transparent ring placed on top of the collar 6. Holes in the wall of sleeve 21 are spaced 90-degrees apart. Each pair of holes 180-degrees apart allows passage of a horizontally-directed portion of a controlling light beam to pass through the axis of the ram. As shown, this embodiment provides for two separate light beams to provide redundancy in case of failure by one of the two systems.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A light-controlled safety switch for a punch press, comprising:

a frame for supporting the working components of said press;

a ram affixed to said frame, said ram being vertically movable between retracted and extended positions;

a housing affixed to said frame;

an emitter affixed to said housing, said emitter projecting a light beam downward parallel to a stroke of said ram;

first ram-mounted means for directing said downward projected light beam laterally through a sleeve located at the end of said ram;

second ram-mounted means for directing said laterally directed light beam upward in the opposite direction and parallel to said downward projected light beam;

a receiver affixed to said housing responsive to said upward directed light beam, said receiver providing signals to an operational controller which controls the operation of the press;

a punch assembly slidably held within said sleeve; and a shutter extending upwardly from the top of said punch assembly within said sleeve, whereby contact by said punch assembly with an object causes said shutter to move upward and break said laterally directed light beam causing said receiver to signal the operational controller to halt the ram.

2. The light-controlled safety switch of claim 1, wherein said first and said second means for directing said light beam are diametrically opposed light-reflective points along the inner surface of a concave frustoconical collar mounted on said ram.

3. The light-controlled safety switch of claim 2, wherein a well around the top of the collar is filled with a transparent material.

4. The light-controlled safety switch of claim 1, wherein said first and second means for directing said light beam comprises a prism in the form of a downward-convergent frustoconical collar affixed to said ram.

5. The light-controlled safety switch of claim 4, wherein said sleeve is cylindrical.

6. The light-controlled safety switch of claim 5, wherein said horizontally-directed light beam passes through diametrically opposed holes in the wall of said sleeve.

7. The light-controlled safety switch of claim 1, further including a second light emitter and a second light receiver mounted on said housing for projecting and responding to a second light beam directed through said ram sleeve.

8. The light-controlled safety switch of claim 7, wherein a path of said second light beam is symmetrical to, but offset 90-degrees radially from, said first light beam path.

9. A light-controlled safety switch for a punch press, comprising:

a frame for supporting the working components of said press;

a ram affixed to said frame, said ram being movable between retracted and extended positions;

an emitter affixed to said frame, said emitter projecting a light beam parallel to a stroke of said ram;

ram-mounted means for directing said light beam to a receiver affixed to said frame for providing signals to an operational controller which controls the operation of the press;

a punch assembly moveably affixed to said ram; and a shutter affixed to said punch assembly, whereby contact by said punch assembly with an object causes said shutter to move and thereby influence said directed light beam causing said receiver to signal the operational controller to halt the ram.

* * * * *